US012649135B2

(12) United States Patent
Risseeuw et al.

(10) Patent No.: US 12,649,135 B2
(45) Date of Patent: Jun. 9, 2026

(54) FLAMELESS COMBUSTION BURNER FOR AN ENDOTHERMIC REACTION PROCESS

(71) Applicant: TECHNIP ENERGIES FRANCE SAS, Nanterre Cedex (FR)

(72) Inventors: Izaak Jacobus Risseeuw, Zoetermeer (NL); Anna Ingielewicz, Zoetermeer (NL); Ünal Kinik, Zoetermeer (NL); Marco Willie Marie Van Goethem, Zoetermeer (NL); Emmanouela Korkakaki, Zoetermeer (NL)

(73) Assignee: TECHNIP ENERGIES FRANCE SAS., Nanterre Cedex (FR)

( * ) Notice: Subject to any disclaimer, the term of this patent is extended or adjusted under 35 U.S.C. 154(b) by 753 days.

(21) Appl. No.: 17/916,020

(22) PCT Filed: Mar. 30, 2021

(86) PCT No.: PCT/EP2021/058271
§ 371 (c)(1),
(2) Date: Sep. 29, 2022

(87) PCT Pub. No.: WO2021/198242
PCT Pub. Date: Oct. 7, 2021

(65) Prior Publication Data
US 2023/0158467 A1     May 25, 2023

(30) Foreign Application Priority Data
Mar. 31, 2020    (EP) ..................................... 20386016

(51) Int. Cl.
B01J 19/00         (2006.01)
F23C 6/04          (2006.01)

(52) U.S. Cl.
CPC .......... B01J 19/0013 (2013.01); F23C 6/047 (2013.01); B01J 2208/00132 (2013.01);
(Continued)

(58) Field of Classification Search
CPC .................. B01J 8/062; B01J 19/00013; B01J 2219/00081; B01J 2219/00092;
(Continued)

(56) References Cited

U.S. PATENT DOCUMENTS

| | | | | |
|---|---|---|---|---|
| 4,714,593 | A | * | 12/1987 | Naito ..................... B01J 8/0285 422/204 |
| 7,166,139 | B2 | * | 1/2007 | Wunning ................ C01B 3/501 422/198 |
| 2011/0158860 | A1 | | 6/2011 | Son |

FOREIGN PATENT DOCUMENTS

| | | |
|---|---|---|
| EP | 2407224 A1 | 1/2012 |
| WO | 2011130103 A1 | 10/2011 |

OTHER PUBLICATIONS

PCT International Search Report and Written Opinion dated May 17, 2021, issued during the prosecution of corresponding PCT International Patent Application No. PCT/EP2021/058271.

* cited by examiner

*Primary Examiner* — Lessanework Seifu
(74) *Attorney, Agent, or Firm* — Troutman Pepper Locke LLP; Gabrielle L. Gelozin

(57) ABSTRACT

The present invention relates to a combustion heater (100) for providing controlled heat (H) to an endothermic reaction process. The combustion heater comprises an integrated burner (20) to yield a hot burner exhaust gas (35) flow from burning a first fuel. The burner exhaust gas mixed with oxidant flows to a flue gas outlet along a flue gas flow path (FGP). Provided to the combustion chamber at a position outside a direct reach of flames from the burner is a secondary fuel conduit (30) with a plurality of nozzles (31) from which a second fuel (32) is transferred into a flow along the said flue gas flow path (FGP). The resulting combustion of the second fuel can be used to provide (Continued)

controlled heat to the to endothermic reaction operated in a reaction conduit (40) that is in thermal heat exchange with the combustion chamber.

16 Claims, 7 Drawing Sheets

(52) U.S. Cl.
CPC ................. *B01J 2208/00194* (2013.01); *B01J 2208/00309* (2013.01); *B01J 2208/00504* (2013.01); *B01J 2208/0053* (2013.01); *B01J 2219/00081* (2013.01); *B01J 2219/00092* (2013.01); *B01J 2219/00117* (2013.01); *C01B 2203/0811* (2013.01); *F23C 2201/301* (2013.01); *F23C 2900/99001* (2013.01)

(58) Field of Classification Search
CPC .... B01J 2219/00117; B01J 2208/00132; B01J 2208/00194; B01J 2208/00309; B01J 2208/0053; B01J 2208/00504; F23C 6/047; F23C 2201/301
See application file for complete search history.

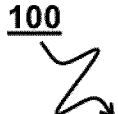
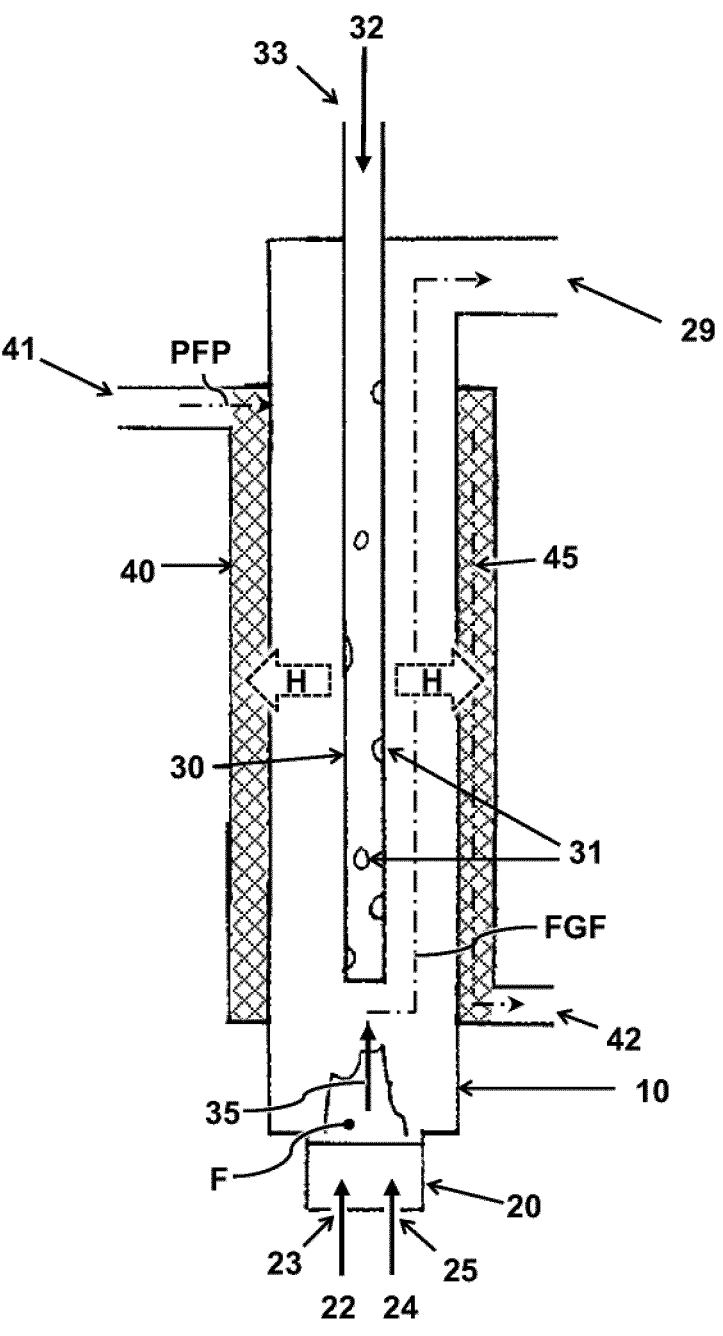
FIG 1

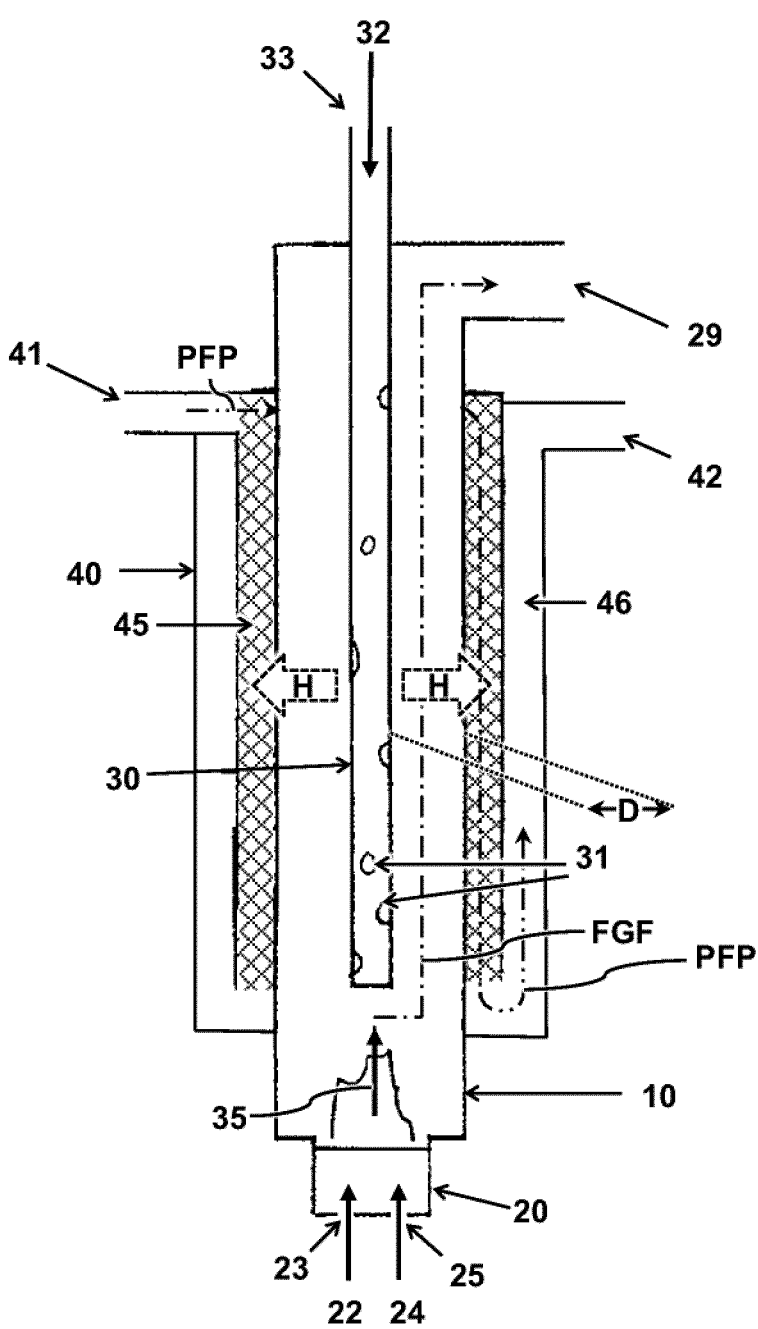
FIG 2

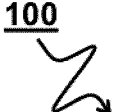
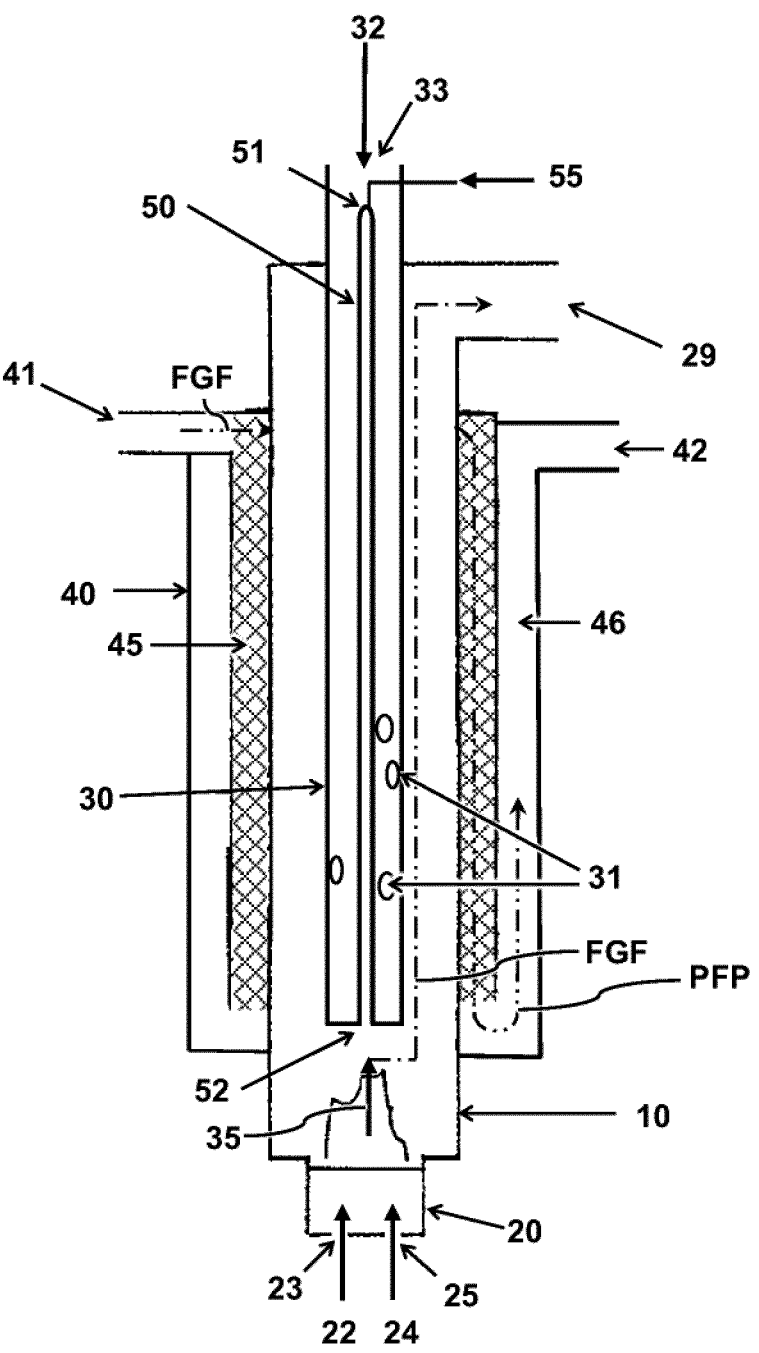
FIG 3

100

41

42

10

40

44

FGF

FGF

FIG 6A                    FIG 6B

FLAMELESS COMBUSTION BURNER FOR AN ENDOTHERMIC REACTION PROCESS

CROSS-REFERENCE TO RELATED APPLICATIONS

This application is a U.S. National Stage filed under 35 U.S.C. § 371, based on International PCT Application No. PCT/EP2021/058271, filed on Mar. 30, 2021, which claims priority to European Application EP20386016.8 filed on Mar. 31, 2020 in the European Patent Office. The entire contents of these applications are incorporated herein by reference in their entirety.

TECHNICAL FIELD AND BACKGROUND

The present invention relates to a combustion heater, in particular a combustion heater comprising a reaction conduit for providing controlled heat to an endothermic reaction process. The present disclosure relates to a method of obtaining a reaction product of an endothermic reaction, in particular a method using the combustion heater according to the invention.

Generally, yields of high temperature endothermic processes such as steam reforming of hydrocarbons, cracking of hydrocarbons; and catalytic dehydrogenation, improve with increasing temperatures. Therefore, it is advantageous to operate at high temperatures. However, these high temperatures are generally limited by metallurgical limitations, e.g., of the materials that are in the reactor, such as reaction-and/or fuel conduits. Therefore it is desirable to have control over heat transfer to the such materials such as reaction conduits.

It is well known to people skilled in the art that high temperature furnaces are used for providing heat to high temperature endothermic reactions. Conventional high temperature furnaces use burners to provide the heat for the endothermic reactions. The temperatures of the tube conduits are high and special alloys are required to withstand these high temperatures.

A disadvantage of commonly used furnaces is poor control of heat transfer to the radiant tube conduits. Burner flames produce a peak heat flux and peak temperature of the flame at a certain distance from the burner exit. The location of the peak temperature cannot be accurately controlled with conventional burners. A disadvantage of peak temperatures, e.g., local hotspots, due to poor control over temperature and/or position of flames in conventional burners includes coke may which may develop more rapidly on the tube-side at the location of hot spots. Another disadvantage of prior art is a high emission of the pollutant NOx. In certain areas, the emission of NOx is regulated. Burners in conventional high temperature furnaces generate significant amounts of NOx due to high furnace temperatures and/or presence of hot spots therein. US20050158678A1 describes an apparatus for heating a process fluid in a tube. The apparatus comprises a burner the flames of which directly heat a portion of the tube with process fluids.

Another disadvantage of fired high temperature furnaces is a low energy efficiency of the radiant firebox. Radiation is the main heat transfer mechanism, which is less effective at low temperatures. For this reason, the temperature of the flue gas leaving the radiant firebox is high resulting in low energy efficiency and/or in comparatively high NOx emissions as a result of performing the combustion at a high temperatures.

U.S. Pat. No. 7,108,730 discloses a method for providing controlled heat to an endothermic chemical process. The method discloses a heat flameless combustor or process heater including an oxidation chamber. Before feeding oxidant to the oxidation chamber the oxidant is preheated in a preheater. The disclosed preheater may be a burner wherein fuel is mixed with some of the oxidant and bunt to heat the oxidant flow towards the oxidation. Disadvantages of the disclosed process heater include a low efficiency of the preheater, e.g., a low efficiency in the transfer of heat generated by the burner to the oxidant flow towards the oxidation chamber.

Thus there remains to be a need to provide alternative processes/combustion heaters for treating fluids, whereby/wherein for instance process streams for endothermic reactions can be heated. In particular, there is a need for a simpler process or system or an even more compact process or system, more in particular a process or system which allows reducing CAPEX and/or OPEX. The present invention addresses such a need.

In particular, the presently disclosed invention aims to mitigate one or more of the disadvantages of the cited prior art. The presently disclosed invention further aims to provide a more compact and/or energy efficient combustion heater by integrating and/or combining one or more heater elements and or process flows.

Aspects of the present disclosure relate to a provision of controlled heat. Provision of controlled heat, as used herein, may be understood to relate to the provision of a desired amount of heat, e.g., for sustaining a endothermic reaction, in a controlled fashion while mitigating an exposure of parts of the reactor, such as radiant tubes, to local to peak temperatures or peak heat fluxes, sometimes referred to as hot spots. In order to achieve described objective there is provided a combustion heater, and a method of manufacturing a reaction product of an endothermic reaction using a combustion heater as described herein. The combustion comprises a combustion chamber. In order to provide a first portion of heat the combustion chamber is provided with a burner. Preferably, the burner is integrated into the combustion chamber, e.g., into a sidewall portion at a terminal end of the combustion chamber. The combustion chamber is further provided with a flue gas outlet. The flue gas outlet is preferably provided at an opposing terminal end of the combustion chamber. The burner is arranged for burning a first fuel from a first fuel inlet with an oxidant, e.g. ambient air, from an oxidant inlet. Advantageously, heat from the burner, when in use, exists directly into the combustion chamber. In particular, the hot burner exhaust gas flow exists directly into the combustion chamber. The burner is preferably arranged to burn the first fuel in the presence of an excess oxidant with respect to the first fuel. This can advantageously yield a hot burner exhaust gas flow to the combustion chamber that includes a significant amount, i.e. the remainder, of an oxidant. Alternatively or in addition, an amount of oxidant, e.g. a second oxidant, can be provided to the burner exhaust gas flow. The burner exhaust gas including a significant amount of oxidant, e.g. oxygen, referred to as a preheated flue gas, travels through the combustion chamber along a flue gas flow path towards the flue gas outlet.

The combustion heater further comprises a secondary fuel conduit having a second fuel inlet. The secondary fuel conduit is provided with one or more fuel nozzles, preferably a plurality of fuel nozzles, for transferring a second fuel from the secondary fuel conduit into the combustion chamber.

In use, the secondary fuel is at least in part disposed at a location along said flue gas flow path where it mixes with the hot burner exhaust gas flow comprising a significant amount of oxidant. The temperature of the mixture, in use, exceeds the auto ignition temperature of the second fuel. Inventors surprisingly found that despite the low oxygen content in the hot burner exhaust gas, a mixture comprising said gas and a second fuel can be produced at a temperature above the auto ignition temperature of the second fuel allowing further heat to be generated from a combustion of the second fuel. It will be understood that combustion gasses from the secondary fuel are mixed with and carried along with the burner exhaust gas along the flue gas flow path FGP towards the flue gas outlet. The mixture comprising hot burner exhaust gas and flue gasses from the secondary combustion is herein referred to as flue gas or flue gas flow. Heat from the combustion of the first and second fuels is transferred to wall portions of the combustion chamber from where it, in turn, may be transferred, e.g. by radiative heat transfer, to a separate reaction conduit.

Inventors found that a burner for generating a burner exhaust gas may be integrated into the combusting chamber of a combustion heater. As opposed to devices using a separate heater to supply a preheated exhaust gas flow to a combustion chamber, integrating the burner was found to advantageously yield a more compact device. Further, heat losses in such device, e.g. due to transport of remotely generated heat, can be minimized as a second fuel and the burner exhaust gas can be directly mixed, e.g. within one and the same combustion chamber. Further it is found that integrating the burner in the combustion chamber has the advantage that heat radiation from the primary combustion zone will heat fuel in the secondary combustion zone, thus increasing the secondary fuel temperature and improving combustion stability of the secondary combustion zone.

The secondary fuel conduit is it is preferably located outside a direct reach of flames from the burner. Positioning the secondary fuel conduit out of direct reach of flames from the burner mitigates formation of hot spots, e.g. due to contact with flames, and disadvantages associated therewith. The secondary fuel conduit can be inside or outside, e.g. alongside, the combustion chamber. Positioning the secondary fuel conduit inside the combustion chamber can advantageously allow the second fuel to be preheated before entering into the combustion chamber. Positioning the secondary fuel conduit outside the combustion chamber can advantageously allow the second fuel to remain cooler inside the conduit before entering the combustion chamber, reducing a rate of coking and/or metal dusting. it is noted that, irrespective of the position of the secondary fuel conduit, the one or more fuel nozzles open in the combustion chamber The combustion heater according to the invention may be understood to comprise a primary combustion zone including the burner generating heat, in use, from burning the primary fuel. In addition, the combustion heater may be understood to comprise a secondary combustion zone, separate from the first, in which, in use, heat is generated from a combustion of the secondary fuel in a secondary combustion process. The secondary combustion zone being defined along the flue gas flow path, and preferably located outside a direct reach of flames from the burner, when in use. Advantageously, the secondary combustion process can be a flameless combustion. Arranging the secondary combustion zone to be a flameless combustion zone can advantageously improve control of heat transfer, e.g., to an outside wall of the combustion chamber and/or to a reaction conduit disposed along said outside wall or disposed in an interior volume the combustion chamber. Mitigating the formation of hotspots, e.g. by arranging the secondary combustion zone to be a flameless combustion zone, can reduce undesired high temperature side reactions, reducing e.g., NOx emissions which may be subject of strict emission regulations. Mitigation of the formation of hotspots can advantageously reduce coke formation, e.g. due to thermal decomposition of hydrocarbon compounds, e.g., fuel, or hydrocarbon compounds in the reaction conduit. For combustion heaters comprising a reaction conduit loaded with catalyst mitigation of the formation of hotspots can reduce thermally induced catalyst degradation for comprised in the reaction conduit. Reduced catalyst degradation and/or reduced coking can advantageously reduce downtime of the combustion heater and any reaction conduits associated therewith.

Further aspects of the present disclosure relate to a method of obtaining a reaction product of an endothermic reaction. In particular to methods comprising the combustion heater as described herein.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 1 schematically illustrates a cross section side view of an embodiment of a combustion heater;

FIG. 2 schematically illustrates a cross section side view of an embodiment of a combustion heater;

FIG. 3 schematically illustrates a cross section side view of an embodiment of a combustion heater;

DESCRIPTION OF EMBODIMENTS

Figure 4:
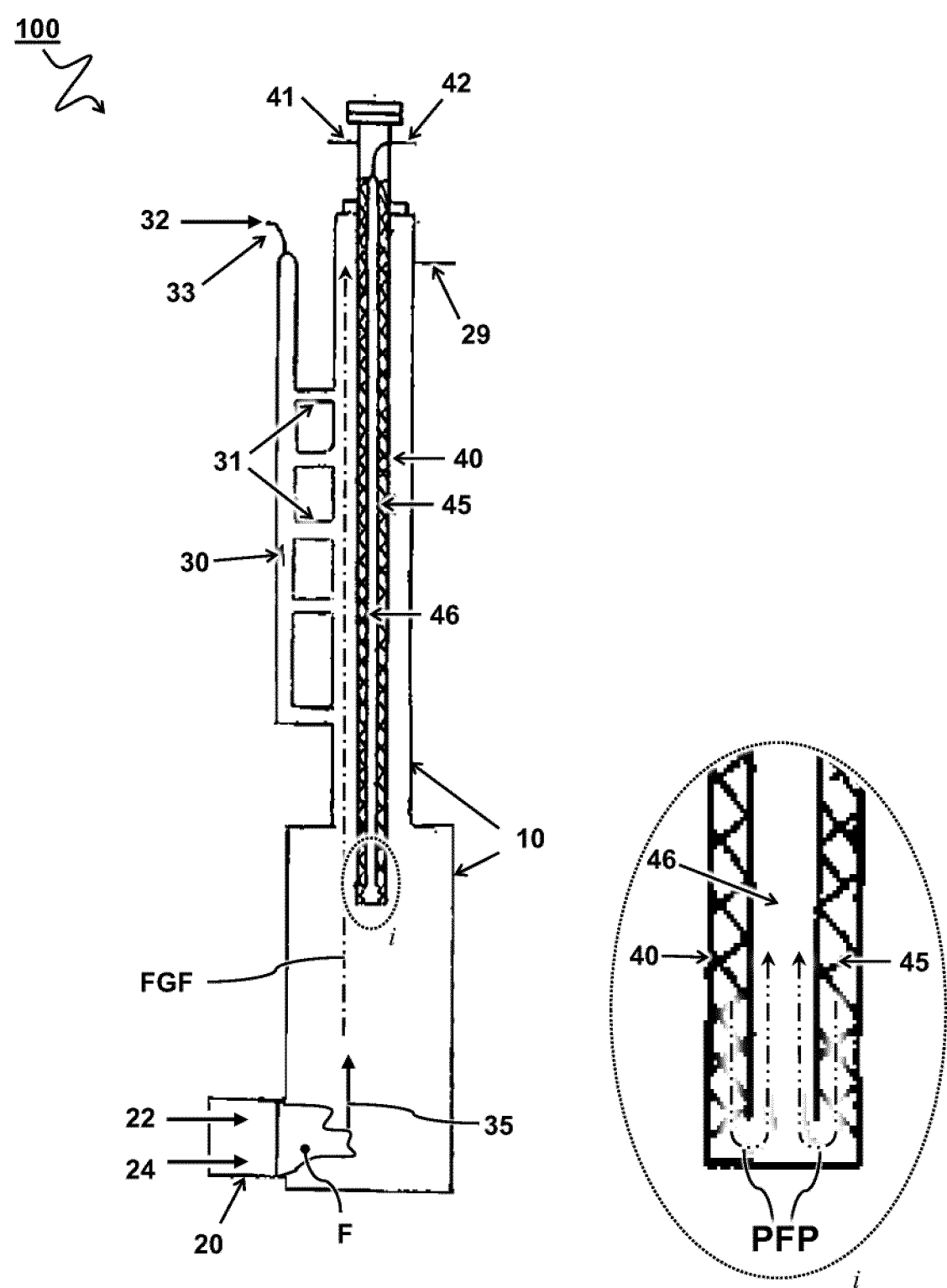
FIG. 4 schematically illustrates a cross section side view of an embodiment of a combustion heater.

Terminology used for describing particular embodiments is not intended to be limiting for the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements through-out. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 provides a schematic cross-section side view of a combustion heater 100 according to an embodiment of the invention. The combustion heater 100, e.g., as shown, is arranged for providing controlled heat H to an endothermic reaction process. The combustion heater 100 comprises a combustion chamber 10 and a secondary fuel conduit 30 provided with a plurality of nozzles 31. The combustion chamber can have a single diameter or cross section area along its length or can have two or more different diameters or cross sectional areas. The combustion chamber 10 comprises a burner 20 for burning a first fuel 22 from a first fuel inlet 23 with an oxidant 24 from an oxidant inlet 25 to yield a hot burner exhaust gas flow 35, a flue gas outlet 29, and a flue gas flow path FGP from said burner 20 to said flue gas outlet 29. It will be appreciated that the flue gas flow path FGP can be understood to be defined between the burner and the flue gas outlet 29, as shown in FIGS. 1-4. As shown, the secondary fuel conduit is located outside a direct reach of flames from the burner, when in use. Preferably, the oxidant 24 is ambient air. The burner is preferably arranged for a lean burn, i.e. to operate with excess of oxidant (e.g., air) in relation to the amount of first fuel. This allows the hot burner exhaust gas 35 to comprise a significant amount of oxidant. Alternatively or additionally, the combustion chamber 10 may be provided with a further oxidant inlet.

In some embodiments, e.g. as shown in FIGS. 1-3 the secondary fuel conduit is enclosed by the combustion cham-ber 10. In other embodiments, e.g. as will be explained in relation to FIG. 4, the secondary fuel conduit is located outside the combustion chamber 10. The fuel nozzles 31 open into the combustion chamber 10, allowing a second fuel 32 to be transferred from the secondary fuel conduit 30 into the combustion chamber 10. The transferred second fuel partakes in the secondary combustion process, generating heat which may be used to advantage.

In a preferred embodiment, e.g. as shown, the combustion heater includes a reaction conduit 40 for transporting one or more reactants and/or reaction products of the endothermic reaction process. The reaction conduit 40 comprises a reac-tant feed inlet 41 and a process effluent outlet 42 and provides process flow path PFP between said reactant feed inlet 41 and said process effluent outlet 42, wherein the conduit along is, at least along part of the process flow path PFP, in thermal heat exchange with the combustion chamber 10. Preferably, the reaction conduit runs essentially along the length of the flue gas flow path FGP e.g., parallel to the flue gas flow path FGP. The reaction conduit 40 is in heat exchange with the combustion chamber 10 through direct contact therewith, e.g. with a wall portion of the combustion chamber 10, preferably by sharing a wall portion with the combustion chamber 10 along at least part of the flue gas flow path (FGP). Providing a reaction conduit 40 that along runs essentially along the length of the flue gas flow path can yield optimized energy efficiency, i.e. optimized transfer of the heat generated in secondary combustion process to the reaction conduit. As radiative heat transfer is believed to be the main mode of heat transfer the reaction conduit 40 is preferably arranged as radiant conduits, e.g. a radiant tube conduit. The reaction conduits can be constructed from round pipe, however also other shapes such as elliptical shape, square shape or rectangular shape are possible. The reaction conduits may contain catalyst 45 if this is required for the reaction(s). Accordingly, in some embodiments the reaction conduits contain a catalyst 45, e.g., a catalyst or catalyst bed receiving radiant heat from the reaction conduit wall. In some embodiments, the combustion heater 100 the comprises more than one, e.g. a plurality, of reaction con-duits, which can be installed in series or parallel or in any combination of series and parallel. Provision of more than one reaction conduit 40 can increase throughput and/or improve energy efficiency of the combustion heater 100.

It is noted that, although the secondary combustion pro-cess can advantageously be a flameless combustion process, temperature in the combustion chamber 10 typically rises to values in excess of about eight hundred degrees Celsius. To allow homogeneous distribution of heat the nozzles are preferably arranged, e.g. distributed along the length of the secondary fuel conduit 30, such that at least part, preferably all of the transferred second fuel is distributed along the flue gas flow path FGP. To tune an amount and/or location where the fuel is distributed one or more of the plurality of fuel nozzles preferably comprises a means to reversible open or close said nozzle. For example, nozzles may be provided with a screw tread matching a tread of a bolt or cap, e.g., a cap nut. By providing fuel nozzles which comprise a means to reversible open or close said nozzle, can allow adapting the total amount and/or position at which the second fuel is fed into the combustion chamber, e.g. in correspondence with a heat demand of a given endothermic reaction. The nozzles may be further arranged, e.g. dimensioned such that fuel is jetted with a velocity such that a jet of second fuel transferred from the nozzle does not contact wall portions of the combustion chamber 10 and/or down stream wall portion of the reaction conduit 40, e.g. such that the fuel jet is dragged along with the flue gas flow, e.g. stays in the annular space within the combustion chamber, without touching side walls such tubing of the reaction conduit tube of the sec-ondary fuel conduit. If the fuel velocity is too high, the fuel jet penetrates far, e.g. into the annulus between fuel conduit and reaction conduit, and may possibly touch a side wall of the reaction conduit, e.g. a tube, causing uneven distribution of heat and/or formation of a local hot spot. If the fuel velocity is too low, the fuel jet may possibly touch a down stream side wall portion of the fuel pipe, possibly causing uneven distribution of heat and or formation of a local hot spot. Separation distance D between opposing wall portion along the flue gas flow path FGP, e.g., annulus dimensions, may be in a range between about ten millimeter and one hundred millimeter or more e.g. two hundred millimeter. Typically annulus dimensions may be in a range between about twenty, e.g., twenty five millimeter and 60 millimeter. Gas (flue gas) velocity in the annulus may vary over a broad range, depending on operating conditions of the combustion heater. Typically gas in the annulus can have a velocity in a range between about two and fifty meters per second, e.g. in a range between about for and twenty meters per second. The dimension of the nozzle opening and/or second fuel velocity can depend annulus dimension and/or gas velocity in the annulus. Typically nozzle openings may have a dimension in a range between about one and about ten mm, e.g. in a range, between two and about six millimeter. Second fuel velocities can vary over broad range, depending on operating conductions of the combustion heater. Typically fuel velocities in are in a range between about five and five hundred meters per second, with higher nozzle openings typically corresponding to lower fuel velocities.

Figure 5:
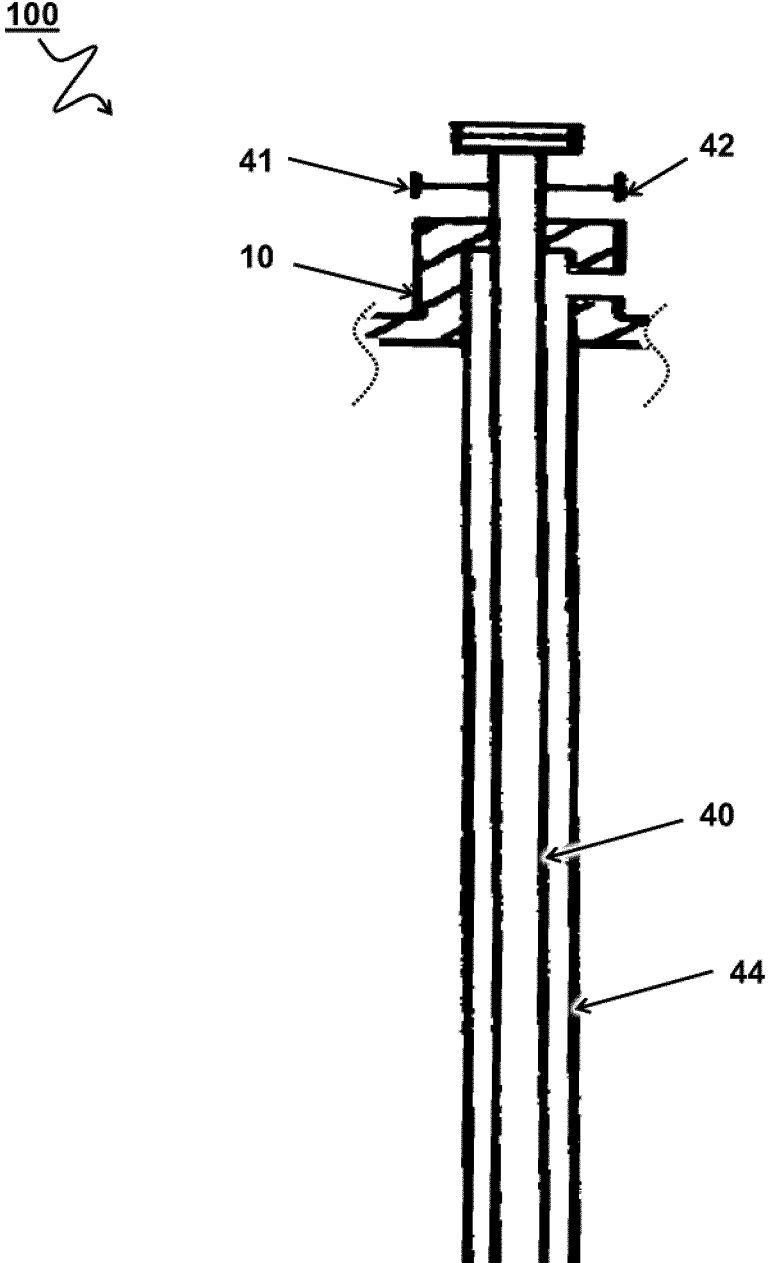
FIG. 5 schematically illustrates a detailed partial cross section side view of an embodiment of a combustion heater.

The reaction conduit may be at least partially enclosed by the combustion chamber, e.g. as shown in relation FIGS. 4 and 5. Alternatively the reaction conduit may be partially enclosed the combustion chamber 10, e.g., as shown in relation to FIGS. 1-3. Providing the reaction conduit 40 along the outside of the combustion chamber 10, e.g. along an outer wall of the combustion chamber 10 can advantageously improve access to the reaction conduit for e.g., for maintenance operations such as cleaning and/or catalyst exchange.

For combustion heaters that are arranged to provide heat to comparative high pressure endothermic reactions at a pressure in excess of about two barg, preferably more, e.g. in excess of twenty barg, e.g., in a range between thirty and one hundred barg the reaction conduit is preferably at least partly enclosed by the combustion chamber. Enclosing the combustion chamber 10 around the reaction conduit 40 allows use of a conventionally designed or even a premade high pressure reaction conduits, e.g., high pressure tubes reactors. For combustion heaters that are arranged to provide heat to comparatively low pressure endothermic reactions at a pressure P below about thirty barg, preferably below five barg, e.g. in a range between two and zero barg such as one barg, the combustion chamber it may be more practical, e.g. for maintenance reasons, for the combustion chamber 10 to be enclosed by the reaction conduit. Accordingly, in some embodiments, the combustion heater 100 is at least partly enclosed by the reaction conduit 40. In other or further embodiments, the reaction conduit is at least partly enclosed by the combustion chamber, e.g., as shown in FIGS. 4-5.

In some embodiments, e.g. as shown in FIG. 2, the reaction conduit 40 contains a return pipe 46, e.g., a bayonet or sleeve type return pipe 46. Provision of a return pipe 46 can advantageously allow inserting the process feed and retrieving reaction products from the same end of the combustion heater, e.g., arranging the reaction conduit to have its reactant feed inlet 41 and process effluent outlet 42 on the same terminal end of the reaction conduit 40. Provision of a return pipe 46 can further improve overall energy efficiency of the combustion heater 100 as thermal heat energy of the reaction effluent can be partly recovered and transferred to the reaction feed. Accordingly, provision of a return pipe 46 can reduce heat loss and/or improve heat usage by pre-heating an incoming process feed using radiant heat from the system and/or by shielding the process flow path from losses to ambient by a warm return flow including reaction products.

In a preferred embodiment, the reaction conduit is arranged to, in use, provide turbulent flow along the process flow path. Provision of a turbulent flow along the process flow can advantageously improve heat transfer from the reaction conduit, e.g. the radiant tube wall, to the reagents in the conduit. To this end the separation distance between opposing bounding walls of the reaction conduits in direction transverse to the flow path (process flow path width) is preferably small, e.g. annulus shape. In principle there is no theoretical limit on the separation distance. The narrower the reaction conduit the more even the heat distribution across the tube. The wider the tube the higher the possible throughput at a given pressure of flow speed. Inventors found the distance is preferably in a range between five millimeter and two hundred millimeter, more preferably in a range between ten and one hundred millimeter, e.g., between twenty and eighty millimeter such as twenty five or seventy millimeter, even or in a range between thirty and sixty such as thirty five or forty five millimeter. Preferably, e.g., as shown, the reaction conduits are annulus shaped. In some embodiments, the reaction conduit may have smooth walls. In other or further embodiments, the reaction conduit may be provided with one or more heat transfer enhancement devices by increasing a radiant surface area and/or by increasing turbulence within the reaction conduit. Suitable heat transfer enhancement devices include but are not limited to helical tubes such as Swirl Flow Tubes, bluff body, hitran devices, twisted tape inserts, internal fins and the like.

If the secondary fuel conduit 30 is located inside the combustion chamber 10, or even when it is located outside the combustion chamber 10, the second fuel may be exposed to a considerable amount of heat. To mitigate overheating of the second fuel transported in the secondary fuel conduit 30 the secondary fuel conduit 30 is preferable provided with a means for heat shielding and/or a means for cooling. Providing the secondary fuel conduit 30 with a means for heat shielding and/or a means for cooling can mitigate coke formation in the fuel conduit due to thermal decomposition. Providing the secondary fuel conduit 30 with a means for shielding and/or a means for cooling can mitigate coke formation in the fuel conduit due to thermal decomposition can advantageously mitigate metal dusting, e.g. on metals in the fuel conduit and/or along the nozzles under influence of a carbon monoxide content possibly comprised the secondary fuel. Accordingly, in some preferred embodiments, the secondary fuel conduit 30 has a heat insulation layer to minimize its temperature rise. e.g., a layer a ceramic fiber heat insulation (e.g., ceramic alumina paper Saffil® or ceramic blanket) having a thickness in a range of about five millimeter to about twenty five millimeter e.g. about ten millimeter, preferably with cover sheeting, e.g., a steel cover sheeting of about 1 mm thickness. Preferably the ceramic fibers are bio persistent to meet European regulatory requirements. Optionally or additionally, the secondary fuel may contain or be mixed with steam, hydrogen and/or carbon dioxide to mitigate coke formation in the secondary fuel conduit. Optionally or additionally, the nozzles and/or the secondary fuel conduit 30 may be formed of and/or coated (lined) on one or more of their interior surfaces with a high alumina content ceramic material or aluminized materials to mitigate metal dusting.

Optionally or additionally the secondary fuel conduit 30 may be provided with a means for cooling to dissipate excess heat. Accordingly, in other or further preferred embodiments, a wall of the secondary fuel conduit is in thermal heat exchange with an external cooling medium. The external cooling medium can for example be outside air. In some embodiments, in particular embodiments wherein the secondary fuel conduit 30 is located outside the combustion chamber 10, e.g. as shown in FIG. 4, a portion of an outside wall of the secondary fuel conduit 30, preferably a portion facing away from the combustion heater 100, may be left uncovered, allowing heat exchange with ambient air. In order to increase the transfer of heat to an external cooling medium it was found that is was particularly effective to provide the secondary fuel conduit 30 with an integrated cooling circuit. FIG. 3 schematically depicts an embodiment of a combustion heater 100 wherein the secondary fuel conduit 30 is provided with an integrated cooling circuit 50. The integrated cooling circuit running along a portion of the secondary fuel conduit 30 and having a coolant inlet 51 and an outlet 52 for a coolant 55 routed. Preferably, the cooling circuit is provided essentially along the length of the secondary fuel conduit 30 between a coolant inlet an coolant outlet to act as heat sink along the heated section of the secondary fuel conduit 30. In some embodiments, the cooling circuit may be provided with a return pipe allowing the coolant to be routed up and down along a length of the secondary fuel conduit 30. This can allow providing both the coolant inlet 51 and outlet 52 on the same terminal end of the cooling circuit 50, e.g., on the same end as the second fuel inlet 33. In a particular preferred embodiment, e.g. as depicted in FIG. 3, the cooling circuit opens up into the combustion chamber 10. In this case the coolant 55 preferably comprises an oxidant, e.g. air. By opening in to the combustion chamber 10, additional oxidant may be provided to support the second combustion process. Preferably, the coolant circuit opens at a position such that the additional oxidant, in use, is directly mixed with the hot burner exhaust gas. Accordingly, the coolant simultaneously increases the oxidant content in the mixture (facilitating the secondary combustion process along the flue gas flow path FGP) and cools the secondary fuel conduit 30.

FIG. 4 schematically illustrates a cross section side view of a further embodiment of a combustion heater 100 according to the invention. Similar to the embodiments depicted in FIGS. 1 and 2 the illustrated a combustion heater 100 comprises a combustion chamber 10 and a secondary fuel conduit 30. Similar to the embodiments depicted in FIGS. 1 and 2 the secondary fuel conduit 30 is provided with nozzles 31. The nozzles open into the combustion chamber 10 along a portion of the flue gas flow path FGP. In contrast to the embodiments depicted in FIGS. 1 and 2 the secondary fuel conduit 30 is provided outside the combustion chamber 10. providing the secondary fuel conduit 30 outside the combustion chamber 10 may, in use reduce heat load experienced by the second fuel 32 transported in the conduit. Optionally, the secondary fuel conduit 30 may be provided with one or more of the cooling or shielding means as described herein. As depicted the combustion chamber 10 can be provided with a comparatively larger dimension, at a position of the burner. This can mitigate hotspot formation on a sidewall of the combustion chamber 10 and/or a terminal end of the reaction conduit 40 which, in the depicted embodiment, is enclosed by a second comparatively more narrow section of the combustion chamber 10. Similar to the reaction conduit 40 included in the embodiments of FIG. 2, the reaction conduit 40 is provided with a catalyst 45 and a return pipe 46, e.g. a bayonet type reaction conduit 40.

In other or further preferred embodiments, the secondary fuel conduit 30 is arranged as an exchangeable secondary fuel pipe, e.g., a secondary fuel pipe comprising a screw tread, clamping, or any other suitable connection means matching a corresponding connection means on the combustion chamber 10. Provision of a exchangeable secondary fuel pipe improves flexibility, e.g., allows using a single combustion chamber for a number of different endothermic processes each requiring or operating under different process conditions, e.g., a specific residence time, operating pressure, temperature, and/or presence of a specific catalyst, etc. Provision of an exchangeable secondary fuel pipe can improve uptime of the combustion heater, e.g., by exchanging a used first fuel pipe with a prepped second fuel pipe, thus reducing time required for maintenance and/or inspection.

In some embodiments, e.g. as shown in FIG. 5 the combustion heater 100, comprises one or more sleeve barriers 44 defining a comparatively narrow flue gas flow path FGP between said sleeve barrier 44 and the reaction conduit 40 within a comparatively wider volume of the combustion chamber 10. Preferably, the sleeve barrier and reaction conduit are of similar shape, e.g. tubular, such that the flue gas flows through a comparatively narrowed annulus. By provision of the sleeve barrier 44 the flue gas flow path is at least for a part confined in the space (annulus) between the reaction conduit and the sleeve barrier. Preferably, the sleeve barrier extends essentially along the length of the flue gas flow path. Confining the flue gas flow in a comparatively narrow volume was found to increase flow turbulence. Increased flow turbulence is believed to increase convective heat transfer to the reaction conduit allowing more effective transfer of heat to the reaction conduit.

Figure 6:
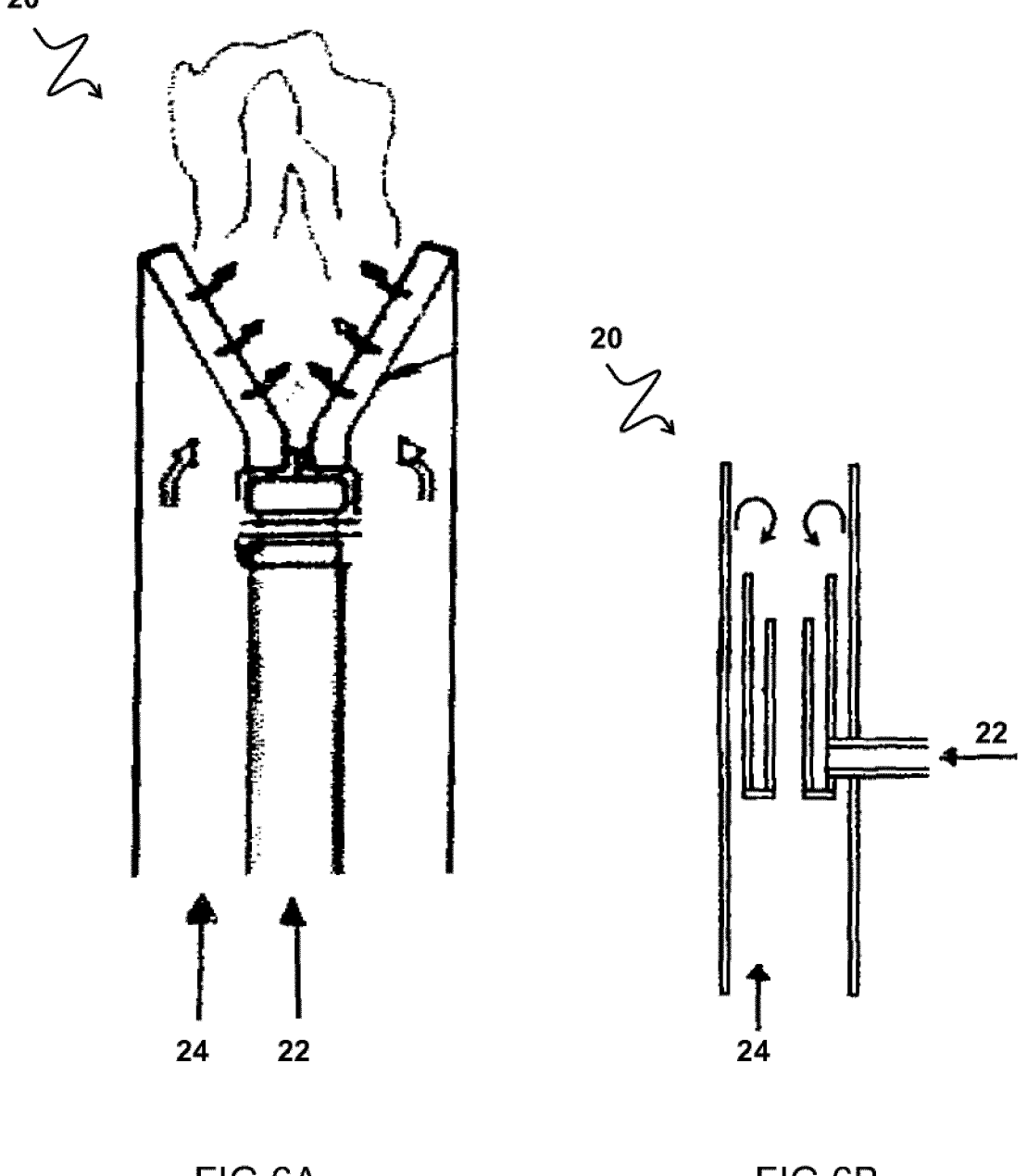
FIGS. 6A and B schematically illustrate a cross section side views of embodiments of a burner.
Figure 7:
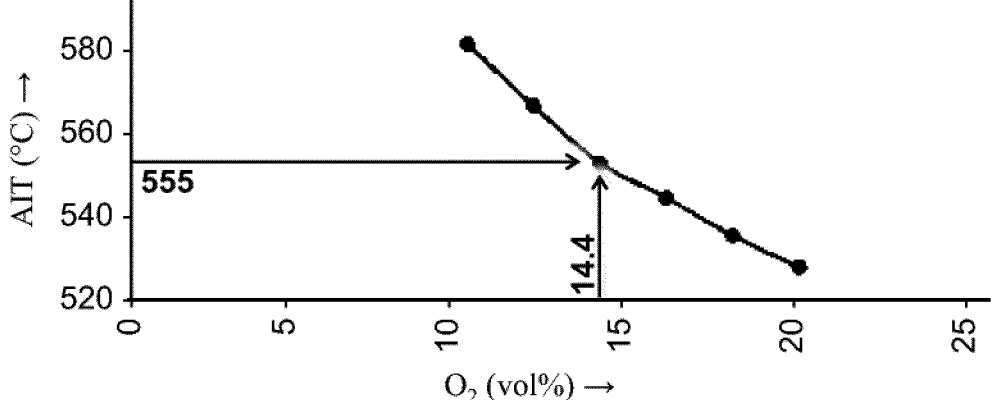
FIG. 7 illustrates evolution of an auto ignition temperature for a methane fuel as function of oxygen content in the flue gas.

As described, according to the invention the burner 20 is arranged to provide hot burner exhaust gas 35. Typically the burner runs on a high caloric fuel, e.g. methane or natural gas. This exhaust gas is, in use, mixed with the second fuel to form a combustible mixture above an auto ignition temperature. The mixture comprises a significant amount of oxidant. FIG. 7 depicts a relation between auto ignition temperature (AIT) and oxygen content for a methane fuel as determined by the inventors. For other fuels, including. low calorific fuels as described herein below, similar relations were found, illustrating that despite a relative low oxygen content combustible mixtures comprising the hot burner exhaust gas and the second fuel can be formed. The oxidant may be provided with the hot burner exhaust gas 35. Optionally or additionally, oxidant may be provided via a separate inlet, e.g. via the 50 coolant circuit. Preferably, the oxidant is at least in part provided with the hot burner exhaust gas 35. This can simplify combustion heater 100 design, e.g., reducing a need for, and control over, separate oxidant inlets. In a preferred embodiment, the burner is arranged to yield a hot burner exhaust gas 35 including an oxygen content in a range between about three and nineteen volume percent. More, preferably in a range between about ten and about fifteen vol %. Preferably, the hot burner exhaust gas 35 has a temperature in excess of at least four hundred degrees Celsius e.g., in excess of about five hundred degrees Celsius or about five hundred and fifty degrees Celsius, or more e.g. in a range between about four hundred and fifty degrees Celsius and about six hundred and fifty degrees Celsius. Preferably, the burner is a burner with a turndown (or maximum to minimum firing ratio) of at least four to one. Provision of a burner having a turndown of at least four to one, preferably more, e.g., ten to one, was found to allow running the nameless combustion heater at over a broader range, e.g. at lower capacity, e.g., at twenty five percent or at ten percent of maximum capacity. Optionally, the oxidant or combustion air to the burner can be preheated, but this is not required. Suitable burners include, but are not limited to, line-type burners or vortex burners e.g., as schematically depicted in FIGS. 6A and 6B.

It will be appreciated that the combustion heater 100 according to the invention may be used to advantage for a broad range of manufacturing process requiring or benefitting from a controlled addition of heat. In particular, the combustion heater 100 according to the invention may be used in a method of obtaining a reaction product of an endothermic reaction. The method comprises providing and operating a combustion heater 100 according to the invention comprising a reaction conduit 40. Operating the combustion heater 100 comprising: supplying the burner 20 with oxidant 24 and a first fuel 22; supplying a second fuel 32 to the reaction conduit 40; providing one or more reactants to the reaction conduit 40; burning at the burner said first fuel 22 with at least part of the oxidant 24 yielding a hot burner exhaust gas flow 35; and transferring the second fuel 32 from the plurality of fuel nozzles to yield a mixture of (preheated) burner exhaust gas and second fuel, wherein the temperature of the mixture exceeds the auto ignition temperature of the second fuel. The heat generated by the combustion of the first and second fuels transferred to the reaction conduits exceeds a heat required to sustain said endothermic reaction. In some embodiments, the burner is provided with an excess oxidant with respect to the first fuel 22 to yield a flow of hot burner exhaust gas 35 including a remainder of the oxidant. Optionally, or additionally oxidant may be added to the combustion chamber 10 via a separate inlet.

In principle the combustion heater 100 and method may be used to benefit for a broad range of endothermic reactions. Inventors found the device and method using the device to be particularly suitable for endothermic reactions selected from the group of:

methane reforming or steam reforming;

cracking of hydrocarbons; and catalytic dehydrogenation, such as catalytic dehydrogenation of ethyl benzene to produce styrene.

It will be understood that, depending on the type of endothermic reactions selected the reactor will be appropriately provided with a catalyst suitable for the corresponding endothermic reaction.

Inventors found that the combustion heater 100 according to the invention need not be operated using exclusively high quality fuels. Advantageously, the second fuel may, be a low calorific fuel having a heating value lower below about thirty mega Joules per kilogram, wherein a low calorific value fuel may be understood to include fuels, e.g., hydrocarbon or hydrogen fuels including a substantial content of non-combustible constituents including but not limited to $N_2$, $CO_2$, $H_2O$, and combinations thereof. Additionally, or alternatively a low heating value fuel may be understood to comprise significant contents of CO. Examples of low heating value fuels include waste gas fuels from a Pressure Swing Absorbtion (PSA) units of hydrogen plants. Exemplary waste gas fuels from a Pressure Swing Absorbtion (PSA) comprise between 20 and 45 vol % of $H_2$, between 4 and 40 vol % of hydrocarbons, e.g., $CH_4$, between 0 and 10 vol % of $N_2$, between 0 and 25 vol % of CO, between 5 and 75 vol % of $CO_2$ and between 0 and 5 vol % of $H_2O$. The table below list various exemplary low heating value fuel compositions that were tested successfully.

| | ex. 1 | ex. 2 | ex. 3 | ex. 4 | ex. 5 | ex. 6 |
|---|---|---|---|---|---|---|
| $H_2$ vol % | 23.2 | 23.8 | 40.3 | 24.4 | 27.6 | 24.4 |
| $CH_4$ vol % | 14.3 | 16 | 27.6 | 13.1 | 4.9 | 12.6 |
| $N_2$ vol % | 6.9 | 0.1 | 0.2 | 0.9 | 0.8 | 0.2 |
| CO vol % | 7.7 | 12.9 | 21.7 | 12.5 | 5.3 | 13.5 |
| $CO_2$ vol % | 46.9 | 47.2 | 10.2 | 48.2 | 60.4 | 48.6 |
| $H_2O$ vol % | 1 | <0.1 | <0.1 | 0.9 | 1 | 0.7 |

The secondary fuel transferred from each of the plurality of fuel nozzles into the combustion chamber is transferred at a velocity such that the secondary fuel is carried along with the flow along the flue gas flow path FGP. Preferably, the velocity is set such that a jet of secondary fuel from each of the nozzle does not contact an outer surface of the reaction conduit nor a downstream wall portion of the secondary fuel pipe. It will be appreciated that the fuel velocity, can depend on the process conditions including but not limited to flue gas velocity, annulus width, and nozzle diameter, which each may correspondingly vary over ranges as described above. The table below provides a set of exemplary combinations of parameters for which the jet of fuel was found to stay in the annulus.

| | comb. 1 | comb. 2 | comb. 3 | comb. 4 |
|---|---|---|---|---|
| Annulus width (mm) | 46 | 46 | 32 | 46 |
| Velocity in annulus (m/s) | 4.1 | 5.8 | 21 | 4.1 |
| Nozzle diameter (mm) | 6 | 2.5 | 2.5 | 4 |
| Fuel velocity (m/s) | 9.5 | 42 | 270 | 14.3 |

For the purpose of clarity and a concise description, features are described herein as part of the same or separate embodiments, however, it will be appreciated that the scope of the invention may include embodiments having combinations of all or some of the features described. The various elements of the embodiments as discussed and shown offer certain advantages, such as optimized heat usage and prevention of hot spots. Of course, it is to be appreciated that any one of the above embodiments or processes may be combined with one or more other embodiments or processes to provide even further improvements in finding and matching designs and advantages. It is appreciated that this disclosure offers particular advantages to processes requiring a constant supply of heat and in general can be applied for any application benefitting from a controlled supply of heat.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise.

The invention claimed is:

1. A combustion heater for providing controlled heat to an endothermic reaction process, the combustion heater comprising a combustion chamber including:

a primary combustion zone including a burner for burning a first fuel from a first fuel inlet with an oxidant from an oxidant inlet to yield a hot burner exhaust gas;

a flue gas outlet; and a flue gas flow path from the burner to the flue gas outlet;

a secondary fuel conduit having a second fuel inlet and provided with a plurality of fuel nozzles for transferring a second fuel from the secondary fuel conduit into the combustion chamber, the nozzles distributed along a length of the secondary fuel conduit and opening into the combustion chamber at a location along the flue gas flow path, to define a secondary combustion zone, separate from the primary combustion zone, for generating heat from combustion of the secondary fuel in a secondary combustion, wherein the secondary fuel conduit is located outside a direct reach of flames from the burner, when in use, and wherein the secondary fuel conduit has an integrated cooling circuit with a coolant inlet for a coolant; and a reaction conduit for a reactant and a product of the endothermic reaction process, the reaction conduit comprising a reactant feed inlet and a process effluent outlet, the reaction conduit providing a process flow path between the reactant feed inlet and the process effluent outlet, wherein the reaction conduit along at least part of the process flow path is in thermal heat exchange with the combustion chamber at a location along the secondary fuel conduit, wherein one or more of the plurality of fuel nozzles comprises a means to reversible open or close said nozzle.

2. The combustion heater according to claim 1, wherein the coolant is an oxidant, and wherein the integrated cooling circuit comprises an outlet exiting into the combustion chamber.

3. The combustion heater according to claim 2, wherein the coolant oxidant is air.

4. The combustion heater according to claim 1, comprising a sleeve barrier positioned between the reaction conduit and an outer wall of the combustion chamber to define a comparatively narrow flue gas flow path between the sleeve barrier and the reaction conduit within a comparatively wider volume of the combustion chamber.

5. The combustion heater according to claim 1, wherein the burner is configured to yield a hot burner exhaust gas flow including an oxygen content in a range between about three and nineteen volume percent.

6. The combustion heater according to claim 1, wherein the burner is configured to provide a maximum to minimum firing ratio of at least 4 to 1.

7. A method of obtaining a reaction product of an endothermic reaction, the method comprising:

providing a combustion heater according to claim 1, the method further comprising:

supplying an oxidant to the oxidant inlet;

supplying a first fuel to the first fuel inlet;

supplying a second fuel to the second fuel inlet;

supplying a coolant to the coolant inlet;

providing one or more reactants the reactant feed inlet of the reaction conduit;

burning the first fuel with the oxidant at the burner yielding a hot burner exhaust gas flow; and transferring the second fuel from the plurality of fuel nozzles into the hot burner exhaust gas flow within the combustion chamber at a location along the flue gas flow path, wherein a temperature of the hot burner exhaust gas flow exceeds an auto ignition temperature of the second fuel and wherein heat generated by combustion of the first and second fuels transferred to the reaction conduit exceeds a heat required to sustain said endothermic reaction.

8. The method according to claim 7, wherein an excess oxidant with respect to the first fuel is provided yielding a hot burner exhaust gas flow including a remainder of the oxidant.

9. The method according to claim 8, wherein the burner is operated to yield a hot burner exhaust gas flow including an oxygen content in a range between about three and nineteen volume percent.

10. The method according to claim 7, wherein the endothermic reaction is selected from the group of:

steam reforming;

cracking of hydrocarbons; and catalytic dehydrogenation.

11. The method according to claim 7, wherein the second fuel is a low calorific fuel having a heating value lower than 30 MJ/kg.

12. The method according to claim 7, wherein a flue gas flow along the flue gas flow path is a turbulent flow.

13. The method according to claim 7, wherein the velocity of the second fuel transferred from each of the plurality of fuel nozzles into the combustion chamber is such that a jet of secondary fuel from each nozzle does not contact an outer surface of the reaction conduit nor a downstream wall portion of the secondary fuel conduit.

14. The method according to claim 7, wherein the coolant is an oxidant, r, and the coolant is mixed with the hot burner exhaust gas flow.

15. The method according to claim 14, wherein the coolant oxidant is air.

16. A combustion heater for providing controlled heat to an endothermic reaction process, the combustion heater comprising a combustion chamber including:

a primary combustion zone including a burner for burning a first fuel from a first fuel inlet with an oxidant from an oxidant inlet to yield a hot burner exhaust gas;

a flue gas outlet; and a flue gas flow path from the burner to the flue gas outlet;

a secondary fuel conduit having a second fuel inlet and provided with a plurality of fuel nozzles for transferring a second fuel from the secondary fuel conduit into the combustion chamber, the nozzles distributed along a length of the secondary fuel conduit and opening into the combustion chamber at a location along the flue gas flow path, to define a secondary combustion zone, separate from the primary combustion zone, for generating heat from combustion of the secondary fuel in a secondary combustion, wherein the secondary fuel conduit is located outside a direct reach of flames from the burner, when in use, and wherein the secondary fuel conduit has an integrated cooling circuit with a coolant inlet for a coolant;

a reaction conduit for a reactant and a product of the endothermic reaction process, the reaction conduit comprising a reactant feed inlet and a process effluent outlet, the reaction conduit providing a process flow path between the reactant feed inlet and the process effluent outlet, wherein the reaction conduit along at least part of the process flow path is in thermal heat exchange with the combustion chamber at a location along the secondary fuel conduit; and a sleeve barrier positioned between the reaction conduit and an outer wall of the combustion chamber to define a comparatively narrow flue gas flow path between the sleeve barrier and the reaction conduit within a comparatively wider volume of the combustion chamber.

* * * * *